US011615048B2

(12) United States Patent
Lin et al.

(10) Patent No.: US 11,615,048 B2
(45) Date of Patent: *Mar. 28, 2023

(54) ADAPTIVE SERIAL GENERAL-PURPOSE INPUT OUTPUT INTERFACE AND SIGNAL RECEIVER THEREOF

(71) Applicant: ASPEED Technology Inc., Hsinchu (TW)

(72) Inventors: Hung-Ming Lin, Hsinchu (TW); Chih-Chiang Mao, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,501

(22) Filed: Dec. 6, 2021

(65) Prior Publication Data

US 2022/0283979 A1 Sep. 8, 2022

Related U.S. Application Data

(63) Continuation-in-part of application No. 17/229,832, filed on Apr. 13, 2021.

(30) Foreign Application Priority Data

Mar. 5, 2021 (TW) ................................. 110107918

(51) Int. Cl.
*G06F 13/42* (2006.01)
(52) U.S. Cl.
CPC ................. *G06F 13/4282* (2013.01)
(58) Field of Classification Search
CPC .............................. G06F 13/4282; H04B 1/38
See application file for complete search history.

(56) References Cited

U.S. PATENT DOCUMENTS

| 2003/0169264 A1 | 9/2003 | Emerson et al. | |
|---|---|---|---|
| 2017/0206906 A1* | 7/2017 | Jung | H04L 65/762 |
| 2022/0281345 A1* | 9/2022 | Kim | G06Q 50/30 |

FOREIGN PATENT DOCUMENTS

TW           200744383          12/2007

OTHER PUBLICATIONS

"Office Action of Taiwan Counterpart Application", dated Jul. 12, 2022, p. 1-p. 7.

* cited by examiner

*Primary Examiner* — Dac V Ha
(74) *Attorney, Agent, or Firm* — JCIPRNET

(57) ABSTRACT

An adaptive serial general-purpose input output (ASGPIO) interface and a signal receiver thereof suitable for a secure control module (SCM) are provided. The ASGPIO interface includes a signal transmitter. The signal transmitter includes a first data buffer, a comparator, and an encoder. The first data buffer receives transmitted data and provides previously transmitted data. The comparator receives currently transmitted data and receives the previously transmitted data. In a first mode, the comparator compares the previously transmitted data with the currently transmitted data to generate a data variation information. The encoder, in the first mode, generates at least one index value and a corresponding instruction signal according to the data variation information. The signal transmitter sends the at least one index value as a serial signal and the instruction signal to a signal receiver.

20 Claims, 9 Drawing Sheets

US 11,615,048 B2

ADAPTIVE SERIAL GENERAL-PURPOSE INPUT OUTPUT INTERFACE AND SIGNAL RECEIVER THEREOF

CROSS REFERENCE TO RELATED APPLICATION

This application is a continuation-in-part application of and claims the priority benefit of U.S. application Ser. No. 17/229,832, filed on Apr. 13, 2021, now pending, which claims the priority benefit of Taiwan application serial no. 110107918, filed on Mar. 5, 2021. The entirety of each of the above-mentioned patent applications is hereby incorporated by reference herein and made a part of this specification.

BACKGROUND OF THE INVENTION

Field of the Invention

The invention relates to an adaptive serial general-purpose input output (ASGPIO) interface and a signal receiver thereof, and in particular, relates to an adaptive serial general-purpose input output interface and a signal receiver thereof that may reduce transmission latency.

Description of Related Art

In today's technical field, a general-purpose input output (GPIO) interface is a commonly used input output (IO) port and is widely used in remote platform control and management architecture, and is often applied in a secure control module (SCM). For example, in a battery management integrated circuit (BMIC), the GPIO interface is mainly configured to transmit information about voltage/temperature and fan monitoring. In design, in order to reduce the number of pins needed by the traditional GPIO interface, a serial general-purpose input output (SGPIO) interface is often adopted instead.

The following may refer to the system architecture diagrams of various conventional datacenter-ready secure control modules (DC-SCMs) shown in FIG. 1A to FIG. 1E. In FIG. 1, the secure control system of the datacenter may have a baseboard management controller (BMC) 111 and a datacenter-ready secure control interface (DC-SCI) 112. The baseboard management controller 111 may communicate with the datacenter-ready secure control interface 112 via a variety of interfaces. In particular, between the baseboard management controller 111 and the datacenter-ready secure control interface 112, a programmable logic device (PLD) 113 may be used for communication via a general-purpose input output interface. In particular, the datacenter-ready secure control interface 112 may send and receive serial general-purpose input output signals SGPIO0 and SGPIO1, and the baseboard management controller 111 may send and receive general-purpose input output signals in parallel format via general-purpose input output signal pins GPIOs. The programmable logic device 113 is configured to perform a signal conversion between the serial general-purpose input output signals SGPIO0 and SGPIO1 and parallel general-purpose input output signals.

In FIG. 1B, in the secure control system of the datacenter, a motherboard 121 and a secure control module 123 are connected via a datacenter-ready secure control interface 122. In particular, the motherboard 121 carries a central processing unit 1211 and a bridge 1212. The secure control module 123 has a baseboard management controller 1231 thereon. The bridge 1212 and the baseboard management controller 1231 may communicate via a general-purpose input output signal, and the datacenter-ready secure control interface 122 may be used as a medium for converting the general-purpose input output signal between serial and parallel grids.

In FIG. 1C, in the secure control system of the datacenter, a motherboard 131 and a secure control module 1331 are connected via a datacenter-ready secure control interface 132. The secure control module 1331 is disposed on a circuit board 133, and the circuit board 133 additionally carries a baseboard management controller 1332. The motherboard 131 has a host processor module (HPM) 1312 and a central processor 1311. The main processor module 1312 is configured to send and receive the serial general-purpose input output signal SGPIO, and communicate with the secure control module 1331 via the datacenter-ready secure control interface 132.

In FIG. 1D, in the secure control system of the datacenter, a main processor module 1412 and a baseboard management controller 1431 are connected via a datacenter-ready secure control interface 142. The baseboard management controller 1431 and a peripheral expander 1432 are disposed on a circuit board 143 together. The main processor module 1412 and a central processor 1411 are disposed on a motherboard 141 together. The main processor module 1412 is configured to send and receive the serial general-purpose input output signal SGPIO, and communicate with the baseboard management controller 1431 via the datacenter-ready secure control interface 142. In addition, the baseboard management controller 1431 and the peripheral expander 1432 may also communicate via the serial general-purpose input output signal SGPIO.

In FIG. 1E, in the secure control system of the datacenter, a central processing unit 1511, a baseboard management controller 1512, and a peripheral expander 1513 may be disposed on a motherboard 151 together. The baseboard management controller 1512 and the peripheral expander 1513 may communicate via the serial general-purpose input output signal SGPIO.

However, although data transmission by the SGPIO interface reduces demands on hardware pins, an issue of insufficient data transmission speed occurs correspondingly. Especially when there is only one bit variation between the previously transmitted data and the currently transmitted data, the conventional serial general-purpose input output interface still needs to transmit all data bits. Therefore, how to reduce the data transmission latency of the serial general-purpose input output interface is an important issue for those skilled in the art.

SUMMARY OF THE INVENTION

The invention provides an adaptive serial general-purpose input output interface and a signal receiver that may effectively reduce the signal transmission latency of the general-purpose input and output interface.

The ASGPIO interface of the invention includes a signal transmitter. The signal transmitter includes a first data buffer, a comparator, and an encoder. The first data buffer receives transmitted data and provides previously transmitted data. The comparator is coupled to the first data buffer to receive currently transmitted data, and the first data buffer receives the previously transmitted data. In a first mode, the comparator compares the previously transmitted data with the currently transmitted data to generate a data variation information. The encoder is coupled to the comparator, and in the first mode, generates at least one index value and a corresponding instruction signal according to the data variation information. The signal transmitter sends the at least one index value as a serial signal and the instruction signal to a signal receiver.

A signal receiver of the invention includes a decoder. The decoder is coupled to a signal transmitter to receive a transmission signal based on an instruction signal, decode the transmission signal to obtain at least one position of at least one variant bit, and adjust at least one bit of previously received data according to the at least one position to generate currently received data.

Based on the above, in the adaptive serial general-purpose input output interface of the invention, the signal transmitter may compare the previously transmitted data and the currently transmitted data to obtain a data variation information, and by only transmitting the data variation information to the signal receiver, the signal receiver may adjust the previously received data to obtain the correct currently received data according to the data variation information. In this way, the adaptive serial general-purpose input output interface does not need to perform bit by bit transmission of all bits for the currently transmitted data every time, thus reducing the transmission latency caused by the transmission process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
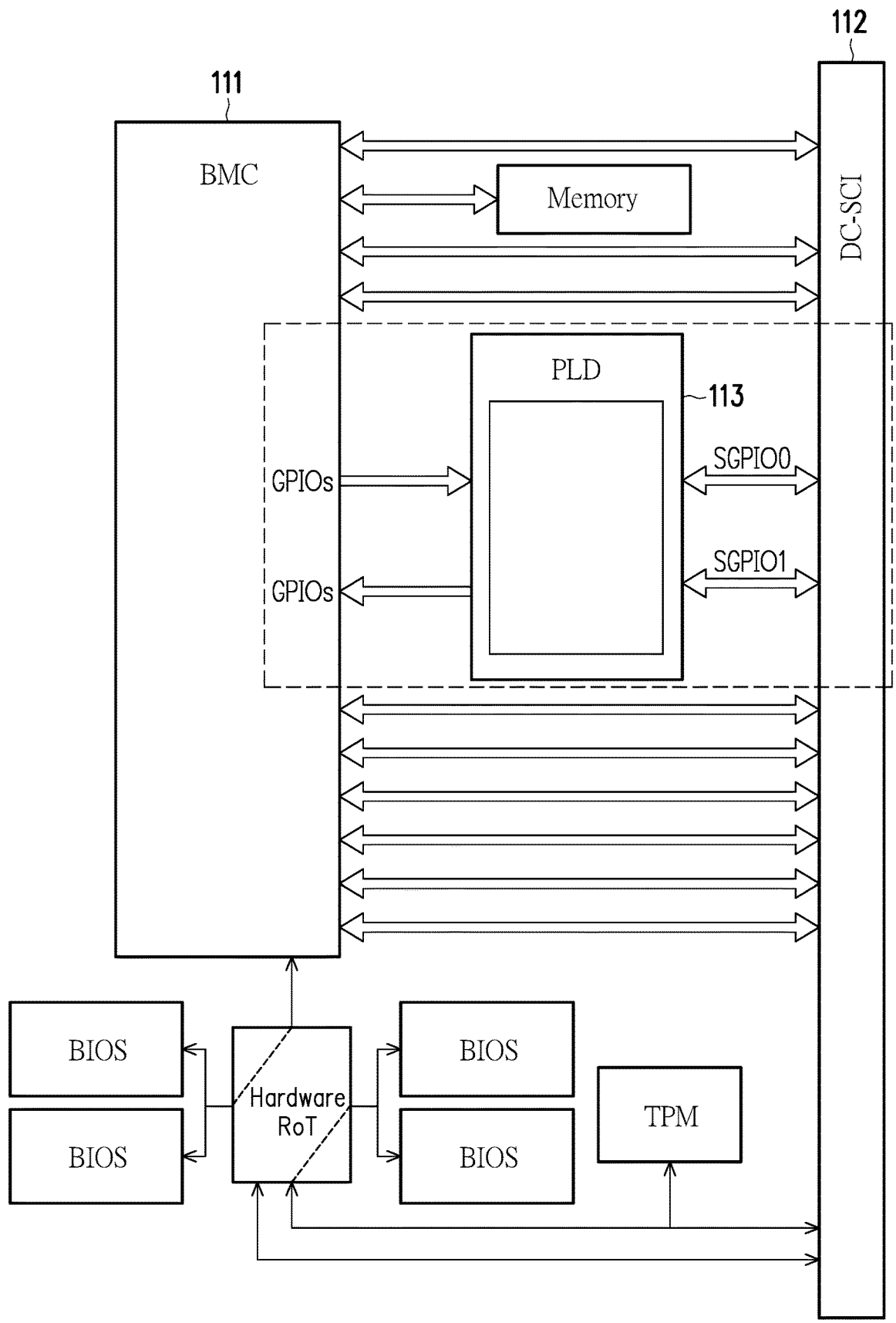
FIG. 1A to FIG. 1E respectively show the architecture diagrams of various conventional datacenter-ready secure control modules (DC-SCMs).
Figure 1B:
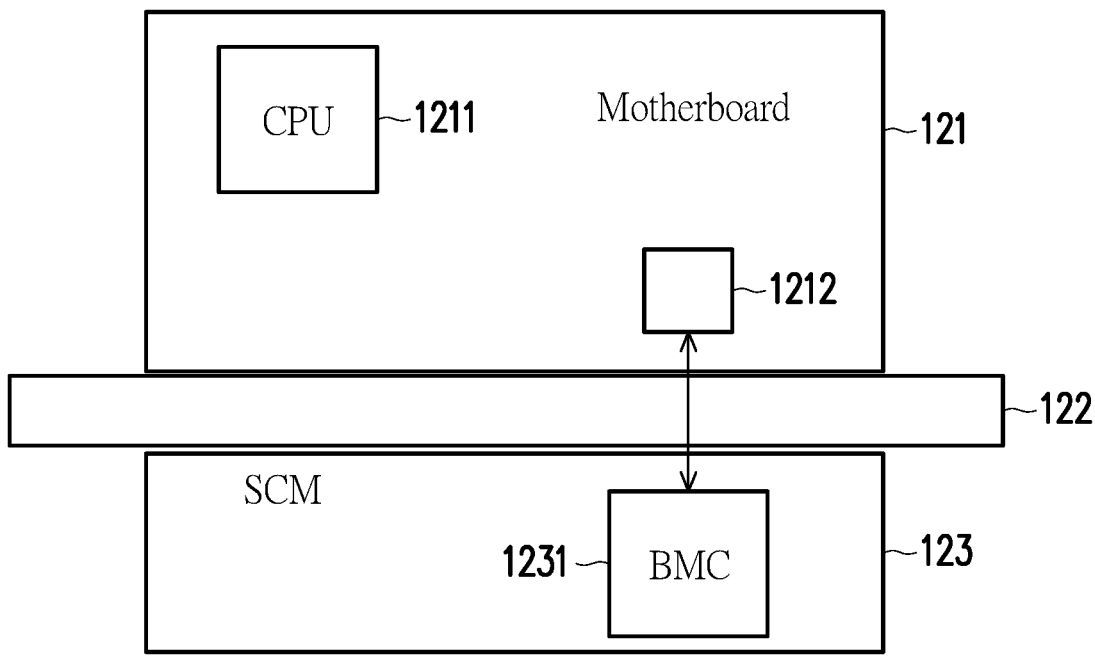
Figure 1C:
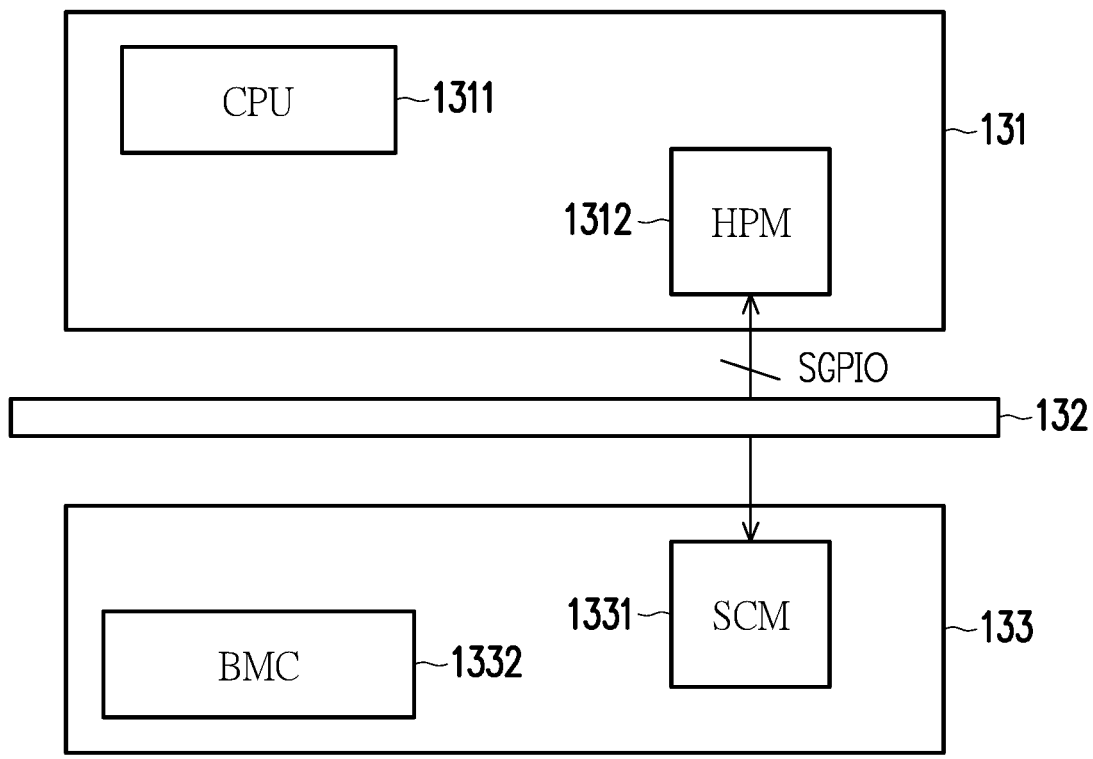
Figure 1D:
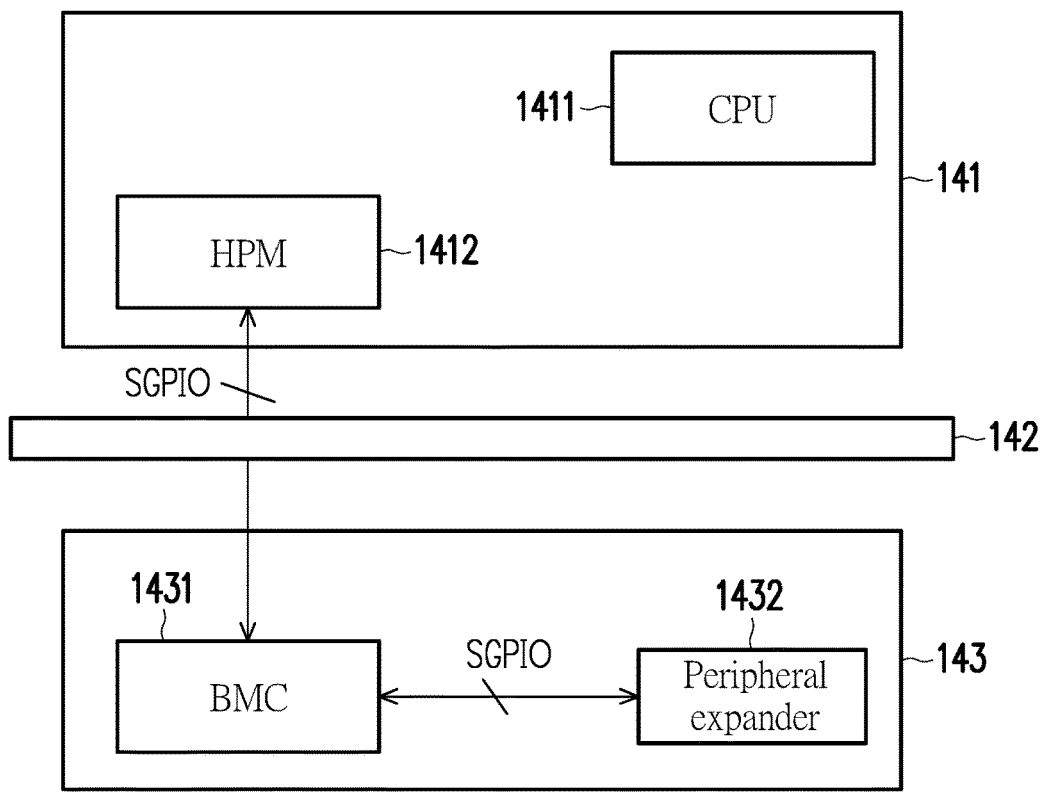
Figure 1E:
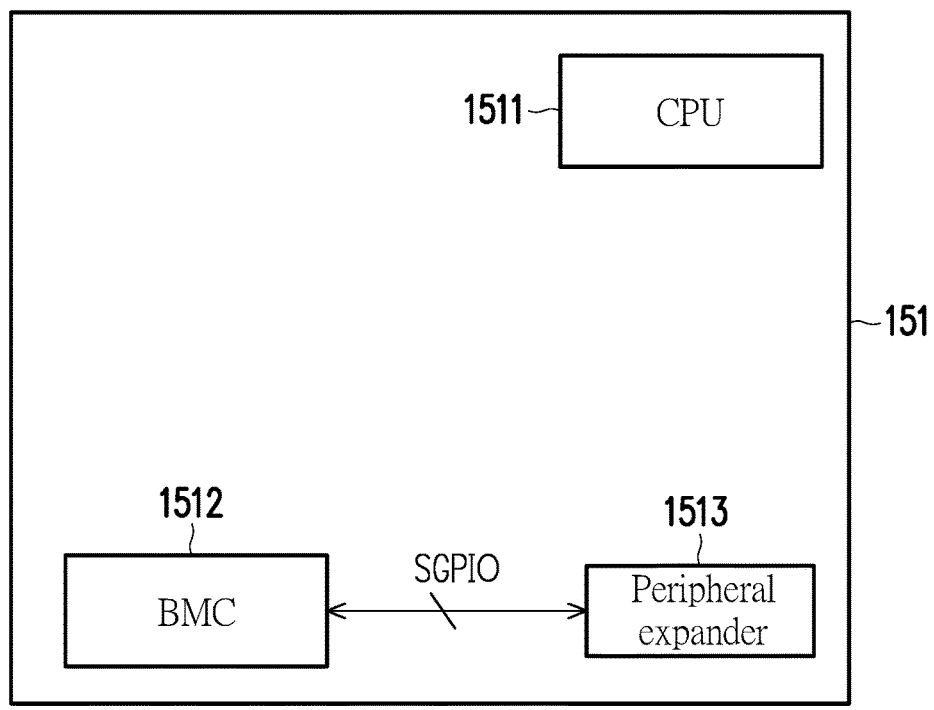
Figure 2:
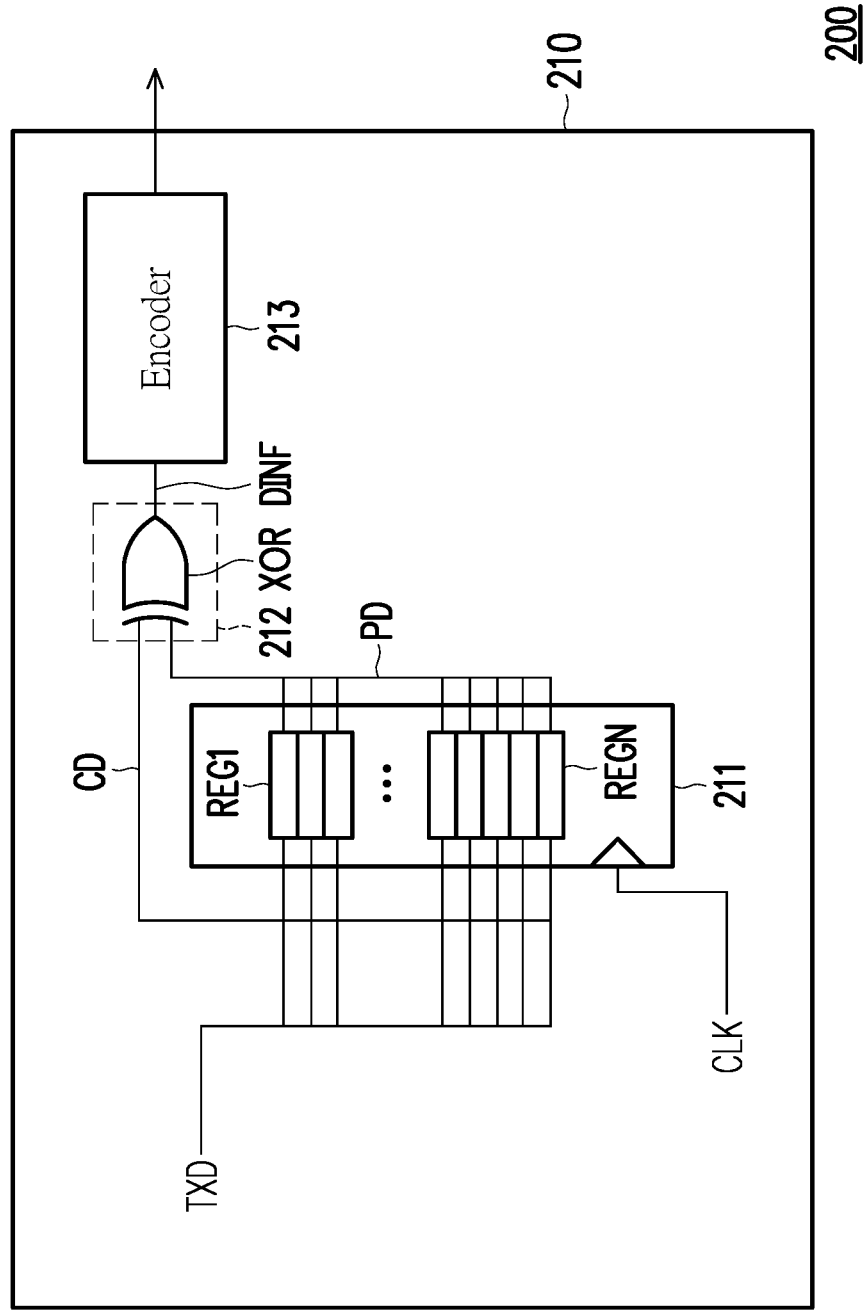
FIG. 2 shows a schematic diagram of an adaptive serial general-purpose input output interface of an embodiment of the invention.

Please refer to FIG. 2. FIG. 2 shows a schematic diagram of an adaptive serial general-purpose input output interface of an embodiment of the invention. An adaptive serial general-purpose input output interface 200 includes a signal transmitter 210. The signal transmitter 210 includes a data buffer 211, a comparator 212, and an encoder 213. The data buffer 211 receives transmitted data TXD, and temporarily stores the transmitted data TXD. In an embodiment of the invention, the data buffer 211 is controlled based on a clock signal CLK. The data buffer 211 provides previously transmitted data PD according to the temporarily stored transmitted data TXD based on the clock signal CLK. In particular, the data buffer 211 may have one register REG or a plurality of registers REG1 to REGN. The register REG may perform storage and output of a single bit of the transmitted data TXD according to the clock signal CLK. The registers REG1 to REGN may respectively store and/or output a plurality of bits of the transmitted data TXD according to the clock signal CLK. In addition, the invention may have not only a first-level data buffer 211, but also a second-level or above data buffer.

In addition, the comparator 212 is coupled to the data buffer 211. The comparator 212 receives currently transmitted data CD and the previously transmitted data PD. When the adaptive serial general-purpose input output interface 200 is operated in a first mode, the comparator 212 respectively compares a plurality of bits of the currently transmitted data CD with a plurality of bits of the previously transmitted data PD. In particular, in the present embodiment, the transmitted data TXD may be used as the currently transmitted data CD and be directly received by the comparator 212, the previously transmitted data PD is provided by the data buffer 211, and the currently transmitted data CD and the previously transmitted data PD have the same bit number.

The comparator 212 compares the plurality of bits of the currently transmitted data CD with the plurality of bits of the previously transmitted data PD, and generates a data variation information DINF based on one or a plurality of changed bits between the currently transmitted data CD and the previously transmitted data PD. In particular, the data variation information DINF may record which bit(s) is/are changed between the currently transmitted data CD and the previously transmitted data PD.

In the present embodiment, the comparator 212 includes a plurality of XOR gates. The number of XOR gates may be the same as the bit number of the currently transmitted data CD (the currently transmitted data CD has the same bit number as the previously transmitted data PD). For example, when both of the currently transmitted data CD and the previously transmitted data PD have eight bits, if the nth bits of the currently transmitted data CD and the previously transmitted data PD are not the same, the corresponding (n-th) XOR gate may generate an output equal to logic 1. If the m-th bits of the currently transmitted data CD and the previously transmitted data PD are the same, the corresponding (m-th) XOR gate may generate an output equal to logic 0, and the above m and n are different positive integers.

According to the above description, the plurality of XOR gates in the comparator 212 may generate the data variation information DINF having a plurality of bits respectively according to the comparison result of a plurality of bits of the corresponding currently transmitted data CD and previously transmitted data PD. In particular, in the present embodiment, the bit of logic 1 in the data variation information DINF indicates that the corresponding bit data of the currently transmitted data CD and the previously transmitted data PD are not the same.

It should be noted here that, any circuit capable of performing data comparison may be applied to the comparator 212 implementing the invention. The implementation of the comparator 212 by the XOR gate in FIG. 2 is merely an example, and is not intended to limit the scope of implementation of the invention. Furthermore, the invention is also not limited to using the bit of logic 1 in the data variation information DINF to indicate that the corresponding bit data of the currently transmitted data CD and the previously transmitted data PD are not the same. For example, logic 1 may also be used to indicate that the corresponding bit data of the currently transmitted data CD and the previously transmitted data PD are the same.

Figure 3A:
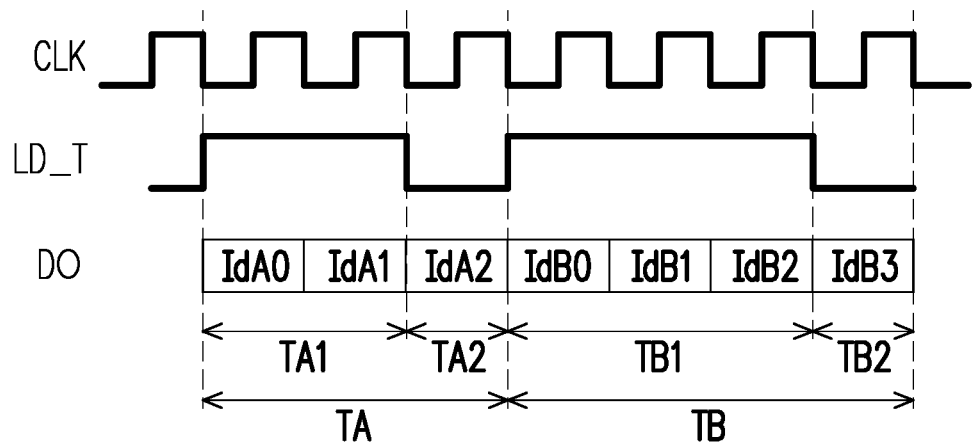
FIG. 3A shows a waveform diagram of a serial signal generated by an encoder of an embodiment of the invention.

The encoder 213 is coupled to the comparator 212. The encoder 213 receives the data variation information DINF generated by the comparator 212, and in the first mode, generates at least one index value and a corresponding instruction signal according to the data variation information DINF. Please refer to FIG. 2 and FIG. 3A at the same time. FIG. 3A shows a waveform diagram of a serial signal generated by an encoder of an embodiment of the invention. In particular, the encoder 213 may generate an index value based on a position of variant bit changed between the previously transmitted data PD and the currently transmitted data CD instructed by the data variation information DINF. For example, if between the previously transmitted data PD and the currently transmitted data CD, the P-th bit and the Q-th bit are changed, the encoder 213 may encode P to an index value composed of digits (for example, binary digits) IdA0 to IdA2, and the encoder 213 encodes Q to an index value composed of digits IdB0 to IdB3, wherein P and Q are positive integers.

The encoder 213 is also based on the clock signal CLK to sequentially concatenate the digits IdA0 to IdA2 and the digits IdB0 to IdB3 into a serial signal in a time interval TA and a time interval TB. Correspondingly, the encoder 213 may generate an instruction signal LD_T according to the content of the digits IdA0 to IdA2 and the digits IdB0 to IdB3. In the present embodiment, the waveform of the instruction signal LD_T may be generated according to the corresponding index value. In particular, corresponding to the index value composed of the 3-bit digits IdA0 to IdA2, the instruction signal LD_T may be kept equal to logic 1 in a sub-time interval TA1 corresponding to 2 bits, and is pulled down to logic 0 in a sub-time interval TA2 corresponding to 1 bit. Moreover, corresponding to the index value composed of the 4-bit digits IdB0 to IdB3, the instruction signal LD_T may be kept equal to logic 1 in a sub-time interval TB1 corresponding to 3 bits, and is pulled down to logic 0 in a sub-time interval TB2 corresponding to 1 bit. In the present embodiment, the sub-time intervals TA2 and TB2 pulled down to logic 0 respectively correspond to the last bit of different index values.

Moreover, in the present embodiment, the bit number of the index value may be determined by a position of variant bit changed between the previously transmitted data PD and the currently transmitted data CD. In particular, when first variant bit is the 4th bit, the digits IdA0 to IdA2 may be 0, 0, and 1, respectively. When second variant bit is the 10th bit, the digits IdB0 to IdB3 may be 0, 1, 0, and 1, respectively. When the position of variant bit is greater than 15 (for example, equal to 16), the index value may have five bits of data and be 0, 0, 0, 0, and 1, respectively.

The transmission sequence of the index value of the present embodiment is not specified, which means the time interval TB in FIG. 3A may also be put before the time interval TA. In an embodiment, the encoder 213 may adjust an arrangement order of the index values according to the importance of variant bit.

It should be mentioned that, in the present embodiment, the bit number of the index value may not be less than 3. When the position of variant bit is not less than 4, the most significant bit in the data of the index value is equal to 1. If the position of the index value is less than 4, the most significant bit in the data of the index value may be 0.

In the present embodiment, the signal transmitter 210 may send a serial signal composed of one or a plurality of index values to a signal receiver via an output signal DO based on the clock signal CLK. The signal transmitter 210 transmits the instruction signal LD_T to the signal receiver corresponding to the output signal DO.

The encoder 213 in the present embodiment may be constructed by a digital circuit. The encoder 213 may be implemented by a truth table, a Karnaugh map, a hardware description language, or any other digital circuit design method known to those skilled in the art, and is not particularly limited.

It should be mentioned that in the present embodiment, the signal transmitter 210 only transmits the position of variant bit of the previously transmitted data PD and the currently transmitted data CD. In this way, the signal receiver may learn the position of variant bit according to the index value, and perform a transition on one or a plurality of bits corresponding to variant bit in the previously transmitted data, so as to obtain the currently received data equal to the currently transmitted data CD. Based on the above, time for data update in the adaptive serial general-purpose input output interface 200 may be effectively reduced, and working efficiency of the system may be improved.

It should be mentioned that, in the present embodiment, in an initial state, the signal transmitter 210 needs to perform at least one bit by bit transmission of the transmitted data TXD to the signal receiver in a second mode, so as to enable the signal receiver to have the previously received data. The subsequent signal transmitter 210 may enter the first mode, and update the transmitted data by transmitting only the index value and the instruction signal.

Since in the second mode, the data buffer 211 and the comparator 212 do not need to perform any actions, the data buffer 211 and the comparator 212 at this time may be disabled to save power consumption.

It should be mentioned that, in an embodiment of the invention, in order to ensure correctness of data, the signal transmitter 210 may perform counting and generate a refresh time cycle according to the counting. The signal transmitter 210 may transmit the transmitted data TXD to the signal receiver bit by bit in a serial manner based on the clock signal (hereinafter "data refreshing") according to the refresh time cycle. In other words, the adaptive serial general-purpose input output interface 200 of an embodiment of the invention may periodically perform the data transmission of the second mode.

Moreover, the signal transmitter 210 may also perform the data refreshing according to a demand command received by an external electronic device, and transmit the transmitted data TXD to the signal receiver bit by bit in a serial manner based on the clock signal.

It is worth mentioning that the counting performed by the signal transmitter 210 may be reset after each data refreshing is completed. In short, the counting performed by the signal transmitter 210 may be restarted after each data transmission of the second mode of the adaptive serial general-purpose input output interface 200 is completed.

Figure 3B:
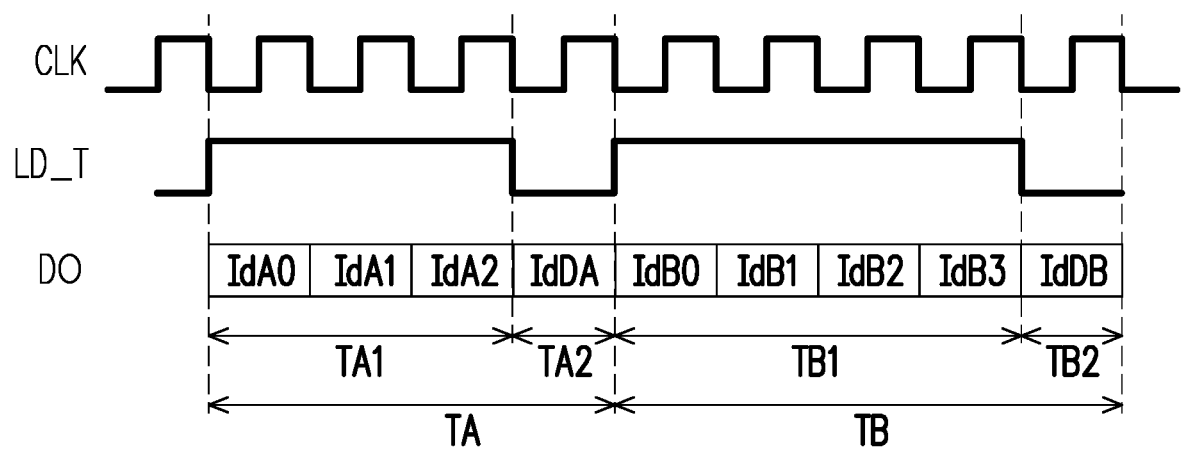
FIG. 3B shows a waveform diagram of a serial signal generated by an encoder of another embodiment of the invention.

In the following paragraphs, please refer to FIG. 2 and FIG. 3B at the same time. FIG. 3B shows a waveform diagram of a serial signal generated by an encoder of another embodiment of the invention. In the present embodiment, in a first mode, the encoder 213 generates an index value and an update datum corresponding to the index value according to the obtained data variation information DINF and the currently transmitted data CD. In the present embodiment, the encoder 213 not only generates the serial signal according to the index value generated by the position of variant bit, but also generates update data according to the bit value of corresponding variant bit in the currently transmitted data CD, and generates a serial signal according to the index value and the corresponding update data. In particular, in FIG. 3B, the encoder 213 may encode a position of first variant bit, and generate an index value composed of the digits (for example, binary codes) IdA0 to IdA2. The encoder 213 encodes a position of second variant bit to generate the index value composed of the digits IdB0 to IdB3. Moreover, the encoder 213 generates update data IdDA and IdDB according to the data corresponding to first variant bit and second variant bit in the currently transmitted data CD, respectively. The encoder 213 then concatenates the digits IdA0 to IdA2, the update datum IdDA, the digits IdB0 to IdB3, and the update datum IdDB in sequence into a serial signal, and sends the serial signal to a signal receiver via the output signal DO.

In the present embodiment, the encoder 213 may pull down the instruction signal LD_T in the sub-time intervals TA2 and TB2, corresponding to the transmission of the update data IdDA and IdDB. In the sub-time intervals TA1 and TB1 in which the digits IdA0 to IdA2 and IdB0 to IdB3 of the index value are sent, the instruction signal LD_T is maintained at logic 1.

Figure 4:
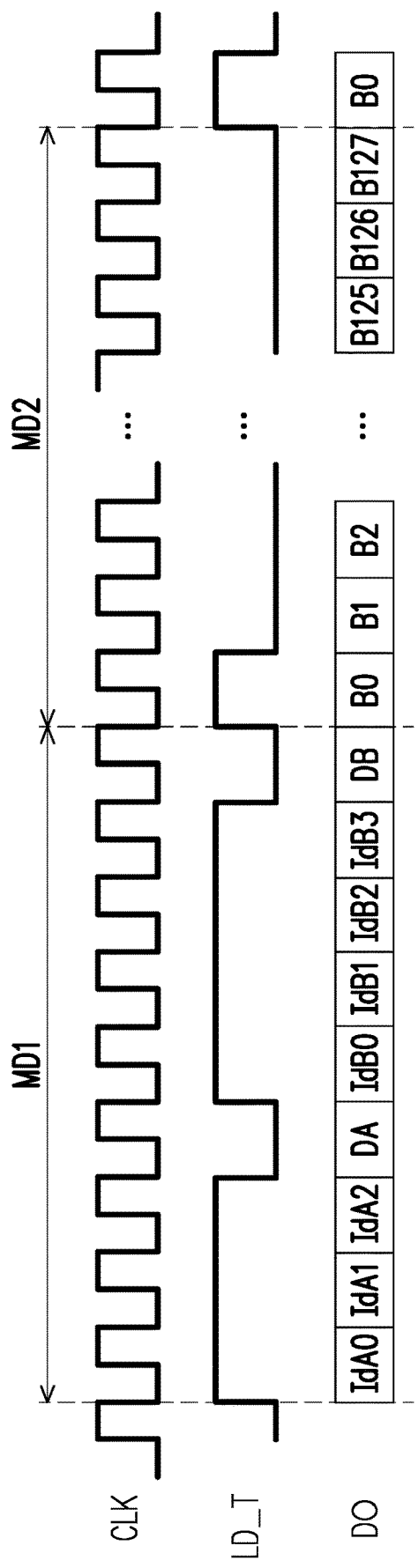
FIG. 4 shows a waveform diagram of an adaptive serial general-purpose input output interface operating in different modes of an embodiment of the invention.

Referring to FIG. 4 below, FIG. 4 shows a schematic diagram of waveforms of an adaptive serial general-purpose input output interface operating in different modes of an embodiment of the invention. In particular, in a first mode MD1, the signal transmitter of the adaptive serial general-purpose input output interface may perform the transmission with the index value and the corresponding update datum as in the embodiment of FIG. 3B. Subsequently, after the first mode MD1, the adaptive serial general-purpose input output interface may be real-time switched to perform in a second mode MD2, and transmit a plurality of bits B0 to B127 of the currently transmitted data bit by bit via the output signal DO in conjunction with the clock signal CLK and the instruction signal LD_T.

It should be mentioned that, in the second mode, the instruction signal LD_T may be used as a synchronization signal. At the time point that the instruction signal LD_T is pulled up from logic 0 to logic 1, the currently transmitted data starts to be transmitted. At the next time point that the instruction signal LD_T is pulled up from logic 0 to logic 1, the transmission of all bits of the currently transmitted data is completed.

In the second mode MD2, a time duration when the instruction signal LD_T is pulled high to logic 1 equals to only one cycle of the clock signal CLK, corresponding to a time duration of the transmission of one bit. In this way, the signal receiver is capable of determining whether the signal transmitter performs the signal transmission based on the agreement of the first mode MD1 or the agreement of the second mode MD2 according to the change of the instruction signal LD_T. In other words, in the first mode MD1, when performing the transmission having the index value and the corresponding update datum as in the embodiment of FIG. 3B, it should be noted that the shortest index value requires two bits to ensure that the signal receiver is capable of determining whether the signal transmitter is based on the agreement of the first mode MD1 or the agreement of the second mode MD2 according to the change of the instruction signal LD_T. Accordingly, in the embodiment of FIG. 3B, when the index value is less than two bits, the index value needs to be complemented to two bits. Similarly, in the first mode MD1, when performing the transmission having only the index value as in the embodiment of FIG. 3A, it should be noted that the shortest index value requires three bits to ensure that the signal receiver may determine whether the signal transmitter is based on the agreement of the first mode MD1 or the agreement of the second mode MD2 according to the change of the instruction signal LD_T. Accordingly, in the embodiment of FIG. 3A, when the index value is less than three bits, the index value needs to be complemented to three bits.

As for the signal transmitter, the instruction signal LD_T is the output signal, and the output signal DO is also the output signal of the signal transmitter. Whereas, for the signal receiver, the instruction signal LD_T is the input signal, and the output signal DO is the input signal of the signal receiver.

Figure 5:
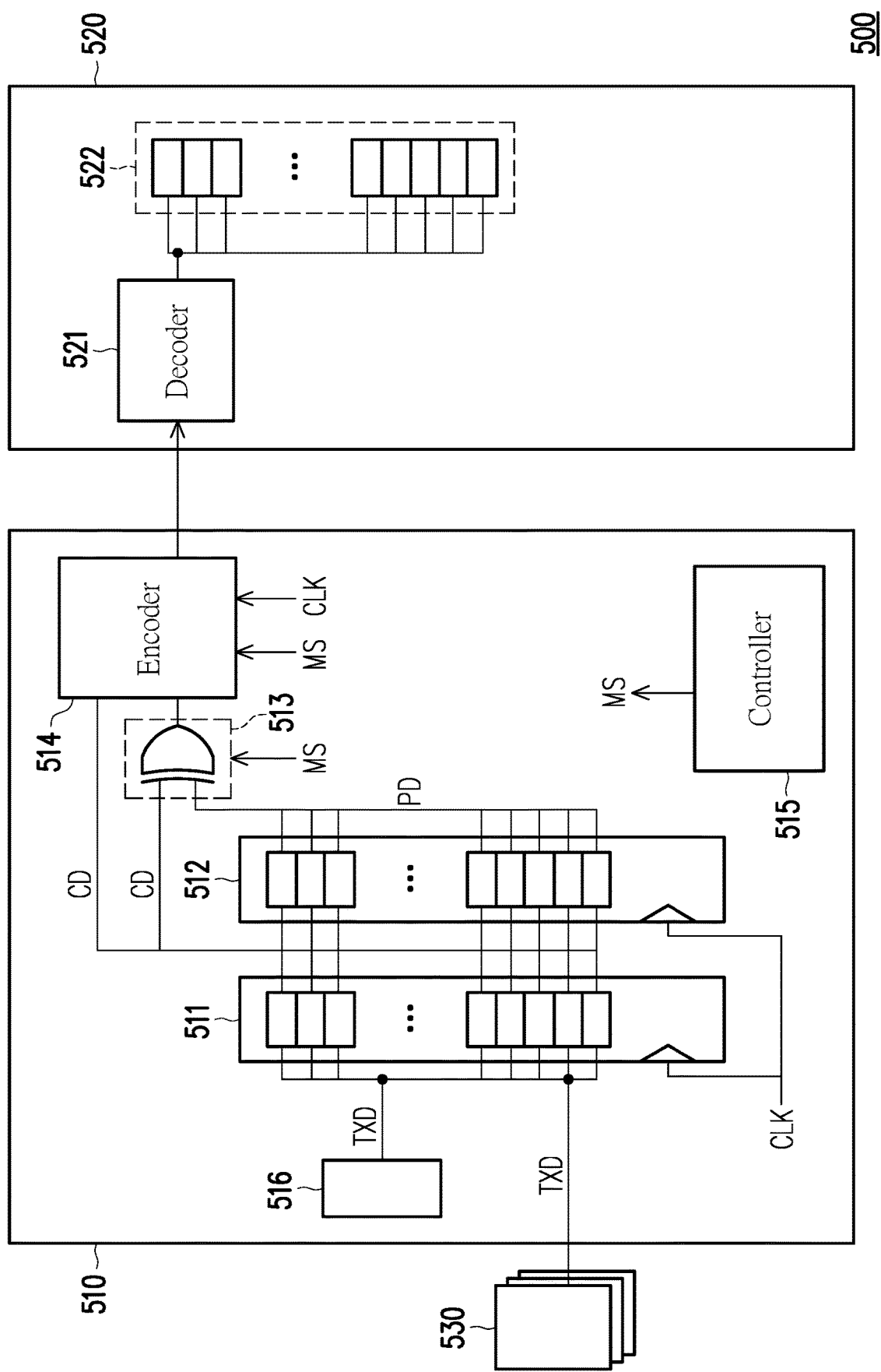
FIG. 5 shows a schematic diagram of an adaptive serial general-purpose input output interface of another embodiment of the invention.

In the following paragraphs, please refer to FIG. 5. FIG. 5 shows a schematic diagram of an adaptive serial general-purpose input output interface of another embodiment of the invention. An adaptive serial general-purpose input output interface 500 includes a signal transmitter 510 and a signal receiver 520. The signal transmitter 510 is coupled to the signal receiver 520. The signal transmitter 510 includes data buffers 511 and 512, a comparator 513, an encoder 514, a controller 515, and an internal circuit 516. The signal transmitter 510 may also be coupled to an external circuit 530. In particular, the data buffer 511 is used as a first-level data buffer for receiving the transmitted data TXD from the internal circuit 516 or the external circuit 530, and temporarily store the transmitted data TXD. The data buffer 511 may be operated according to the clock signal CLK, and transfer the temporarily stored transmitted data TXD to the second-level data buffer 512, and provide the transmitted data TXD as the currently transmitted data CD and provide the currently transmitted data CD to the comparator 513. The data buffer 512 is also operated according to the clock signal CLK, and may be used to provide the previously transmitted data PD to the comparator 513. In particular, the data buffers 511 and 512 may respectively have one register REG or the plurality of registers REG1 to REGN. The register REG may perform storage and output of a single bit of the transmitted data TXD according to the clock signal CLK. The registers REG1 to REGN may respectively perform storage and output of a plurality of bits of the transmitted data TXD according to the clock signal CLK.

The comparator 513 is configured to compare the previously transmitted data PD with the currently transmitted data CD in a first mode, and generate a data variation information accordingly to indicate a position of variant bit. In an embodiment, the encoder 514 receives the data variation information and performs encoding according to the position of variant bit, a mode selection signal MS, and the clock signal CLK to generate a data output signal having an index value and a corresponding instruction signal. In another embodiment, the encoder 514 receives the data variation information and performs encoding according to the position of variant bit and the currently transmitted data CD to generate a data output signal having an index value and an update datum and a corresponding instruction signal.

Regarding the operation details of the signal transmitter 510, detailed descriptions are made in the above plurality of embodiments, and are not repeated herein.

In the present embodiment, the encoder 514 may have a parallel-to-serial circuit that may convert the data variation information which is a parallel signal and output the index value which is a serial signal and the instruction signal.

It should be mentioned that, in the present embodiment, the signal transmitter 510 includes a controller 515. The controller 515 is configured to generate the mode selection signal MS, wherein the controller 515 sets the signal transmitter 510 to work in the first mode or the second mode via the mode selection signal MS. In particular, the controller 515 may calculate a time duration (for example, equal to a time duration TN) needed for the data transmission of the data transmission in the second mode, and set a critical time duration according to the time duration TN. Moreover, the controller 515 may calculate a time duration needed to perform the data transmission of the index value using the first mode (for example, equal to a time duration TM) according to the number and the position of variant bits in the data variation information, and generate the mode selection signal MS by comparing whether the time duration TM is greater than the critical time duration.

In detail, when the time duration TM is less than the critical time duration, the controller 515 may generate the mode selection signal MS which is a first logic value, and cause the signal transmitter 510 to be operated in the first mode. When the time duration TM is not less than the critical time duration, the controller 515 may generate the mode selection signal MS which is a second logic value, and cause the signal transmitter 510 to be operated in the second mode. In particular, the first logic value is opposite to the second logic value.

It should be mentioned that the critical time duration may be equal to or less than the time duration TN.

Moreover, the signal receiver 520 includes a decoder 521 and a data buffer 522. The decoder 521 may receive the data output signal (the output signal DO of FIG. 4), the instruction signal LD_T, and the clock signal CLK from the signal transmitter 510. The decoder 521 may learn a working mode of the signal transmitter 510 by decoding the instruction signal LD_T based on the clock signal CLK. The decoder 521 decodes the data output signal based on the clock signal CLK according to the working mode of the signal transmitter 510, and may obtain the position of one or a plurality of variant bits, or obtain one update datum or a plurality of update data. In another embodiment, the decoder 521 may not directly receive the clock signal CLK, but only receive any signal of the clock signal CLK of the synchronizable signal transmitter 510, and generate the clock signal CLK using a local clock signal CLK1. The decoder 521 may transform one or a plurality of bits of the previously received data according to the position of variant bit, or update the previously received data according to the position of variant bit and the corresponding update data. In this way, the correct current information is obtained.

The currently received data may be stored in the data buffer 522. The decoder 521 may have a serial-to-parallel circuit, and the received serial signal may be converted into a parallel signal and stored in the data buffer 522. The data buffer 522 may be composed of a plurality of registers, and the number of registers may be the same as the bit number of the currently received data.

Figure 6:
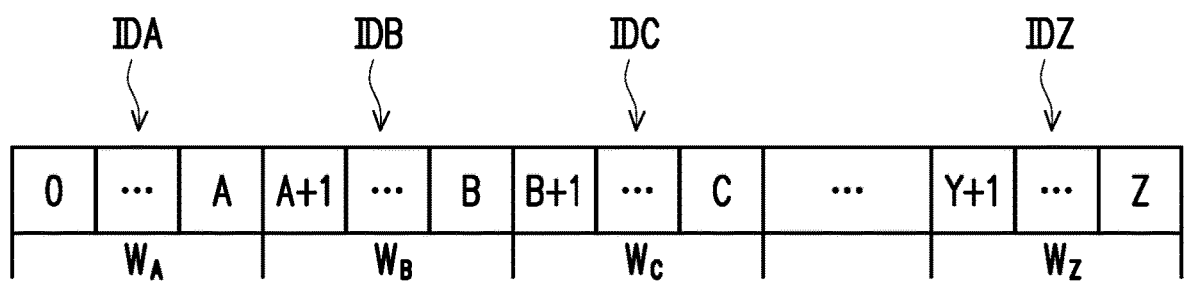
FIG. 6 shows a schematic diagram of an implementation manner of a mode signal generation mechanism of an embodiment of the invention.

Please refer to FIG. 6. FIG. 6 shows a schematic diagram of an implementation manner of a mode signal generation mechanism of an embodiment of the invention. It should be mentioned that, in an embodiment of the invention, the bit number of index values $ID_A$ to $ID_Z$ generated by the encoder of the signal transmitter is varied with the corresponding positions of variant bits. For example, the index value $ID_A$ has A+1 bits; the index value $ID_B$ has B-A bits; the index value $ID_C$ has C-B bits; and the index value $ID_Z$ has Z-Y bits.

Specifically, an index value generated for variant bit of relatively low significant bit may have a first bit number. Another index value generated for another variant bit compared to relatively high significant bit may have a second bit number, and the second bit number may be greater than the first bit number. Therefore, in the present embodiment, a plurality of time weight values $W_A$ to $W_Z$ may be set respectively for different positions corresponding to variant bits. When the signal transmitter is to send transmitted data, the controller may first calculate a sum of time weight values corresponding to all variant bits, and then compare the sum of time weight values with a predetermined critical time value, which may be used as the basis for generating the mode selection signal. In particular, when the total time weight value is less than the predetermined critical time value, the signal transmitter may select the first mode for operation, and when the sum of the time weight value is not less than the predetermined critical time value, the signal transmitter may select the second mode for operation.

Figure 7A:
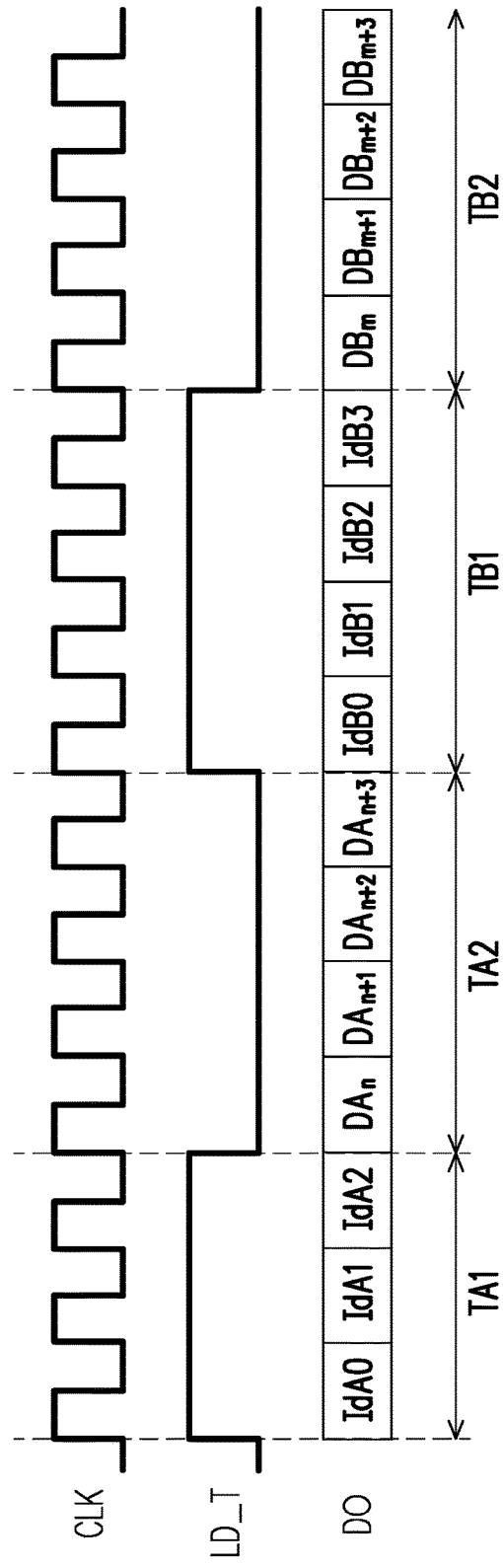
FIG. 7A and FIG. 7B respectively show a waveform diagram of a serial signal generated by an encoder of another embodiment of the invention.
Figure 7B:
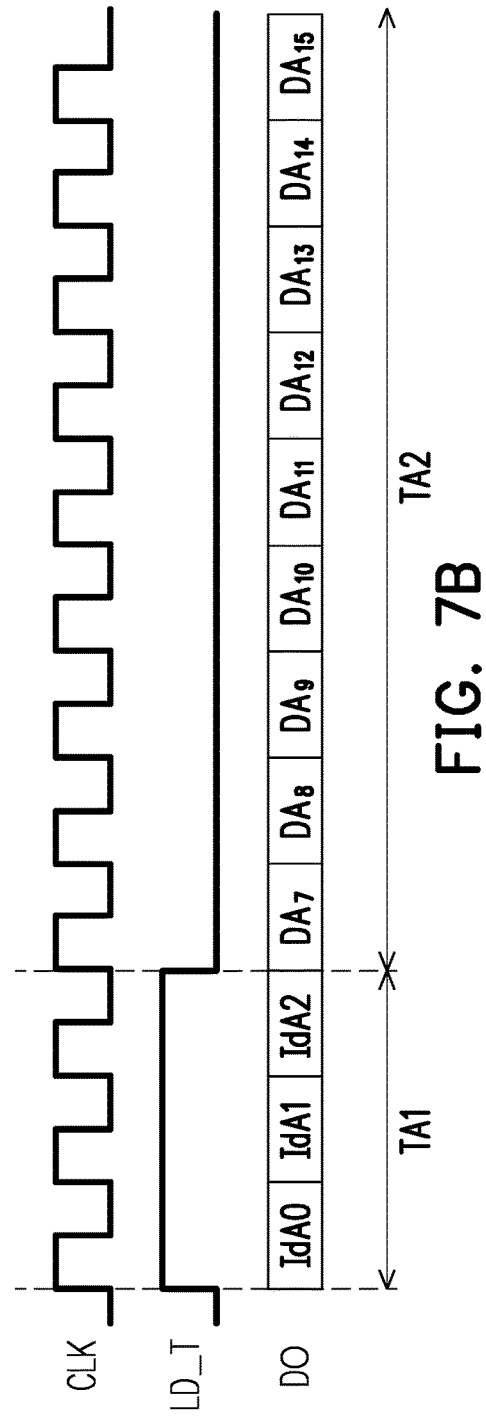

In the following, please refer to FIG. 7A and FIG. 7B. FIG. 7A and FIG. 7B respectively show a waveform diagram of a serial signal generated by an encoder of another embodiment of the invention. FIG. 7A and FIG. 7B show a burst data transmission mode (third mode) of an embodiment of the invention. FIG. 7A and FIG. 7B may be applied to the systems of FIG. 2 and FIG. 5, and only FIG. 2 is used as a representative description below. Please refer to FIG. 2 and FIG. 7A at the same time. In FIG. 7A, the encoder 213 may generate an index value based on the position of start bit of variant bit changed between the previously transmitted data PD and the currently transmitted data CD instructed in the data variation information DINF. For example, if between the previously transmitted data PD and the currently transmitted data CD, the n-th bit and the m-th bit start to be changed by a plurality of bits, the encoder 213 may encode n to generate an index value composed of the digits (for example, binary digits) IdA0 to IdA2, and the encoder 213 encodes m to generate an index value composed of the digits IdB0 to IdB3, wherein n and m are positive integers.

Start bit of variant bit may be set according to the cluster status of the bit order of variant bit between the previously transmitted data PD and the currently transmitted data CD. For example, when the above variant bits may be divided into two groups, first variant bit of the first group may be n-th bit, and first variant bit of the second group may be m-th bit.

The encoder 213 concatenates the digits IdA0 to IdA2 into a serial signal in the sub-time interval TA1 based on the clock signal CLK. The encoder 213 generates the instruction signal LD_T according to the content of the digits IdA0 to IdA2. In particular, corresponding to the index value composed of the 3-bit digits IdA0 to IdA2, the instruction signal LD_T may be kept equal to logic 1 in the sub-time interval TA1 corresponding to 3 bits, and is pulled down to logic 0 in the subsequent sub-time interval TA2. Please note here that in the burst data transmission mode, the indication signal LD_T maintains a time length equal to logic 0 that may correspond to a plurality of cycles of the clock signal CLK. Moreover, when the indication signal LD_T remains equal to logic 0, the encoder 213 makes the output signal DO sequentially transmit update data $DA_n$, $DA_{n+1}$, $DA_{n+2}$, and $DA_{n+3}$ to be updated according to the bit order in the sub-time interval TA2 starting from the n-th bit until the indication signal LD_T is pulled high to logic 1 again.

Then, the encoder 213 generates the instruction signal LD_T according to the content of the digits IdB0 to IdB3. In particular, corresponding to the index value composed of the 4-bit digits IdB0 to IdB3, the instruction signal LD_T may be kept equal to logic 1 in the sub-time interval TB1 corresponding to 4 bits, and is pulled down to logic 0 in the subsequent sub-time interval TB2. Here, the indication signal LD_T maintains a time length equal to logic 0 that may correspond to a plurality of cycles of the clock signal CLK. Moreover, when the indication signal LD_T remains equal to logic 0, the output signal DO sequentially transmits update data $DB_m$, $DB_{m+1}$, $DB_{m+2}$, and $DB_{m+3}$ to be updated according to the bit order starting from the m-th bit until the indication signal LD_T is pulled high to logic 1 again.

Moreover, in FIG. 7B, the encoder 213 may detect that start bit of variant bit is 7th bit according to the data variation information DINF, and a plurality of continuous or discontinuous bits after 7th bit are also variants. At this time, the encoder 213 may encode 7 and generate the digits IdA0 to IdA2, and the digits IdA0 to IdA2 may be equal to 1, 1, and 1. The encoder 213 keeps the indication signal LD_T equal to logic 1 in the sub-time interval TA1. In particular, the sub-time interval TA1 corresponds to the transmission time of three bits. Moreover, in the sub-time interval TA2 after the sub-time interval TA1, the encoder 213 changes the indication signal LD_T to logic 0, and correspondingly transmits the update data $DA_7$, $DA_8$, $DA_9$ ... $DA_{15}$ ... to be updated according to the bit order via the output signal DO. It is worth noting that the transmission of the above update data may be continued until the indication signal LD_T is pulled high to logic 1 again.

It should be noted here that, if the transmission of the update data is maintained to the last bit, the encoder 213 may pull up the instruction signal LD_T to logic 1 after all the update data is transmitted. At this time, the signal transmitter 210 may perform a data refresh or perform a dummy data refresh. In the data refresh, the signal transmitter 210 may perform the data transmission of the second mode. The data transmission of the second mode is described in detail in the above embodiments, and is not repeated herein. In the dummy data refresh, the signal receiver corresponding to the signal transmitter 210 does not perform the data refresh according to the received output signal DO.

Based on the above, the data transmitter of the adaptive serial general-purpose input output interface of the invention may not perform data transmission for all bits of the transmitted data, but only transmit the positions of variant bits. In this way, when only some bits of the currently transmitted data are different from the previously transmitted data, the latency of data transmission may be effectively reduced.

What is claimed is:

1. An adaptive serial general-purpose input output interface, comprising:
   a signal transmitter, comprising:
      a first data buffer receiving currently transmitted data and providing previously transmitted data;
      a comparator, coupled to the first data buffer, for receiving the currently transmitted data, receiving the previously transmitted data from the first data buffer, and comparing, in a first mode, the previously transmitted data with the currently transmitted data to generate a data variation information; and
      an encoder, coupled to the comparator, for generating, in the first mode, at least one index value and a corresponding instruction signal according to the data variation information;
   wherein the signal transmitter sends the at least one index value as a serial signal and the instruction signal,
   wherein the encoder is in the first mode and generates at least one update datum corresponding to the at least one index value according to the data variation information and the currently transmitted data.

2. The adaptive serial general-purpose input output interface of claim 1, wherein the comparator respectively compares a plurality of bits of the previously transmitted data with a plurality of bits of the currently transmitted data, and generates the data variation information based on at least one position of at least one variant bit different from each other.

3. The adaptive serial general-purpose input output interface of claim 1, wherein the encoder generates the at least one index value according to a binary digit of the at least one position.

4. The adaptive serial general-purpose input output interface of claim 3, wherein the at least one index value has more than or equal to three bits.

5. The adaptive serial general-purpose input output interface of claim 1, further comprising:
   a signal receiver, comprising:
      a decoder, coupled to the signal transmitter, for receiving the at least one index value based on the instruction signal and decoding the at least one index value to obtain the at least one position of the at least one variant bit; and
      a controller, coupled to the decoder, for generating currently received data by transforming at least one bit of previously received data according to the at least one position.

6. The adaptive serial general-purpose input output interface of claim 1, wherein the signal transmitter sends a serial signal formed by the at least one index value and the corresponding at least one update datum.

7. The adaptive serial general-purpose input output interface of claim 6, further comprising:
   a signal receiver, comprising:
      a decoder, coupled to the signal transmitter, for receiving the at least one index value based on the instruction signal, decoding the at least one index value to obtain the at least one position of the at least one variant bit, and changing at least one bit in previously received data to generate currently received data according to the at least one position and the at least one update datum.

8. The adaptive serial general-purpose input output interface of claim 1, wherein the signal transmitter further comprises:
   a controller configured to generate a mode selection signal and set the signal transmitter to work in the first mode, a second mode, or a third mode via the mode selection signal.

9. The adaptive serial general-purpose input output interface of claim 8, wherein in the second mode, the signal transmitter transmits the currently transmitted data bit by bit to the signal receiver in a serial manner, based on a clock signal.

10. The adaptive serial general-purpose input output interface of claim 8, wherein in the second mode, the first data buffer and the comparator are disabled and do not perform an operation.

11. The adaptive serial general-purpose input output interface of claim 8, wherein in the third mode, the encoder obtains at least one start bit of a plurality of variant bits according to the data variation information, generates the at least one index value according to the at least one start bit, and generates a plurality of update data corresponding to the at least one index value according to the currently transmitted data.

12. The adaptive serial general-purpose input output interface of claim 8, wherein the controller calculates a first time duration for a data transmission of the at least one index value, and compares the first time duration with a critical time duration to generate the mode selection signal.

13. The adaptive serial general-purpose input output interface of claim 12, wherein the data transmission of the currently transmitted data in the second mode needs a second time duration, and the critical time duration is set according to the second time duration.

14. The adaptive serial general-purpose input output interface of claim 8, wherein the controller respectively sets a plurality of time weight values according to a plurality of bits of the transmitted data, calculates a sum of time weight values corresponding to at least one variant bit according to the data variation information, and generates the mode selection signal based on comparing the sum with a critical time value.

15. The adaptive serial general-purpose input output interface of claim 1, wherein the signal transmitter transmits the transmitted data bit by bit in a serial manner based on a clock signal according to a refresh time cycle, and the signal transmitter further causes the transmitted data to be transmitted bit by bit in a serial manner based on the clock signal according to a demand command.

16. The adaptive serial general-purpose input output interface of claim 15, wherein the signal transmitter counts the refresh time cycle via a counting, and resets the counting according to the demand command or a mode selection signal.

17. The adaptive serial general-purpose input output interface of claim 1, wherein the signal transmitter further comprises:
a second data buffer coupled to a front end of the first data buffer to receive source data and provide the currently transmitted data according to the temporarily stored source data.

18. A signal receiver, comprising:
a decoder, coupled to a signal transmitter, for receiving a transmission signal based on an instruction signal, decoding the transmission signal to obtain at least one position of at least one variant bit, and adjusting at least one bit of previously received data according to the at least one position to generate currently received data,
wherein the transmission signal comprises at least one index value and at least one update datum corresponding to the at least one index value, and a controller changes the at least one bit of previously received data according to the at least one position and the at least one update datum to generate the currently received data.

19. The signal receiver of claim 18, wherein the transmission signal comprises at least one index value, and the controller transforms the at least one bit in the previously received data according to the at least one position to generate the currently received data.

20. A adaptive serial general-purpose input output interface, comprising:
a signal transmitter, comprising:
a first data buffer receiving currently transmitted data and providing previously transmitted data;
a comparator, coupled to the first data buffer, for receiving the currently transmitted data, receiving the previously transmitted data from the first data buffer, and comparing, in a first mode, the previously transmitted data with the currently transmitted data to generate a data variation information;
an encoder, coupled to the comparator, for generating, in the first mode, at least one index value and a corresponding instruction signal according to the data variation information;
wherein the signal transmitter sends the at least one index value which is a serial signal and the instruction signal; and
a second data buffer coupled to a front end of the first data buffer for receiving source data and providing the currently transmitted data according to the temporarily stored source data.

* * * * *